United States Patent
Wagner et al.

[11] 3,794,299
[45] Feb. 26, 1974

[54] CENTRIFUGAL REACTOR

[75] Inventors: Louis E. Wagner, West Seneca; Andrew T. McCord, Snyder; Joseph A. Dorn, Hamburg, all of N.Y.

[73] Assignee: Chem-Trol Pollution Services, Blasdell, N.Y.

[22] Filed: Sept. 23, 1971

[21] Appl. No.: 182,941

[52] U.S. Cl............................ 259/4, 23/252, 23/252
[51] Int. Cl........................................... B01f 15/02
[58] Field of Search..... 259/4, 18, 36; 210/101, 205

[56] References Cited
UNITED STATES PATENTS

| | | | |
|---|---|---|---|
| 2,653,801 | 9/1953 | Fontein | 259/4 |
| 2,784,948 | 3/1957 | Pahl | 259/4 |
| 2,992,084 | 7/1961 | Schropp | 259/4 |
| 3,542,342 | 11/1970 | Barron | 259/4 |

*Primary Examiner*—Robert W. Jenkins
*Attorney, Agent, or Firm*—Christel & Bean

[57] ABSTRACT

A centrifugal reactor comprising an enclosure having an inlet for directing a stream of waste reactant tangentially into the enclosure and forming a film moving in a downwardly spiraling path along the inner wall surfaces of the enclosure. A second waste reactant is fed through the top of the enclosure into a sparger which directs such second waste reactant as a spray against the spirally moving film at substantially right angles thereto effecting a complete blending and neutralization of the two waste reactants.

10 Claims, 7 Drawing Figures

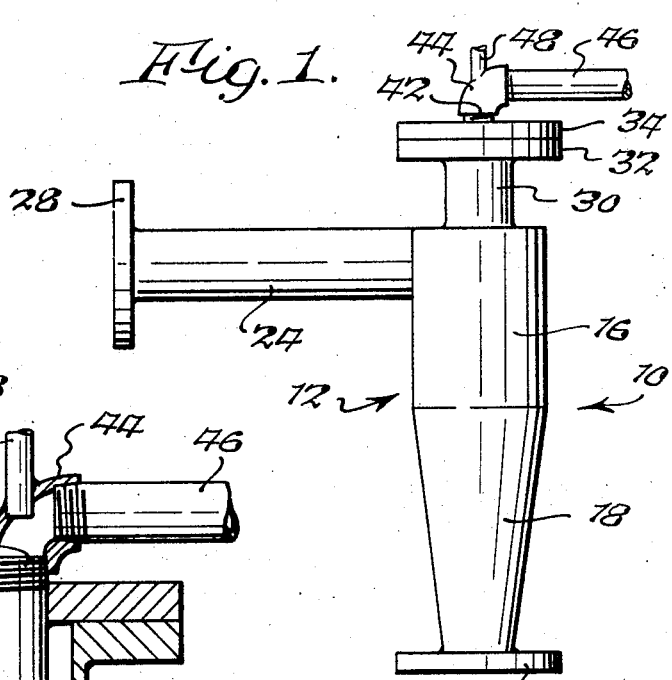
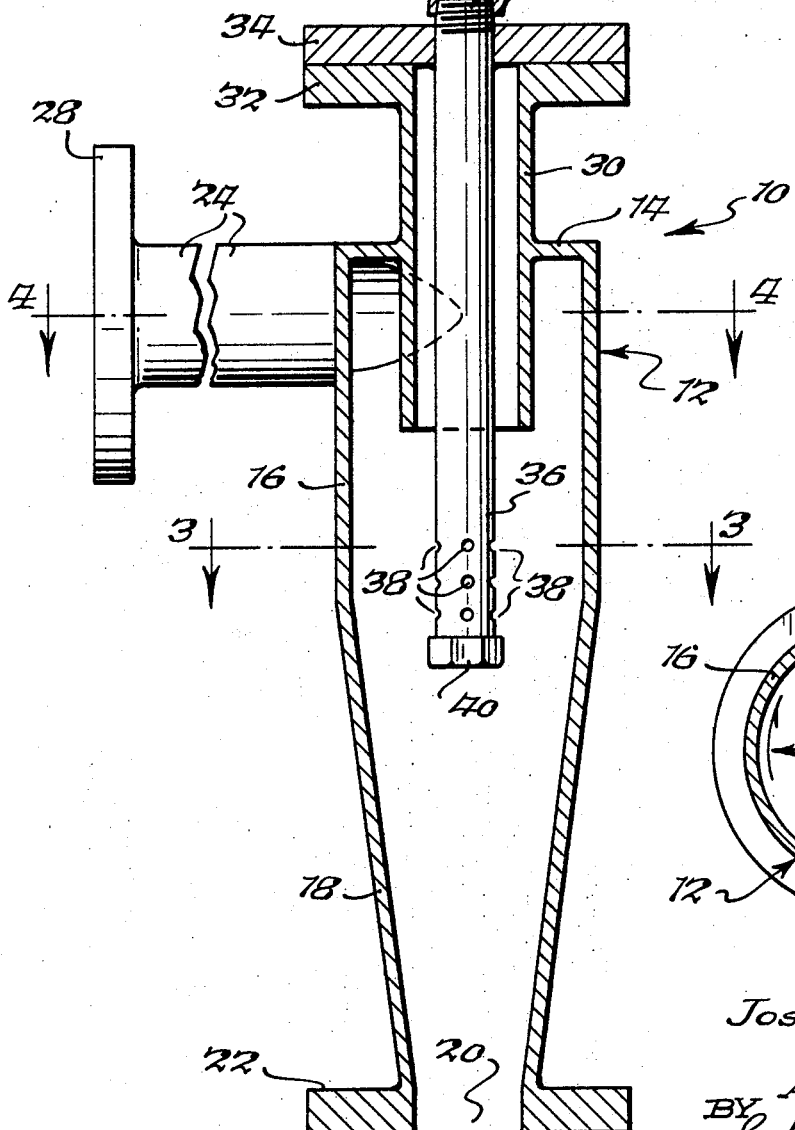
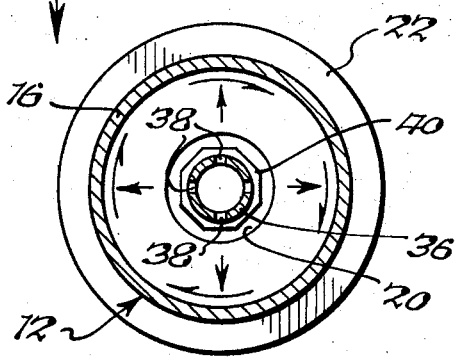
INVENTORS
Joseph A. Dorn
Louis E. Wagner
Andrew T. McCord
BY Christel & Bean
ATTORNEYS.

PATENTED FEB 26 1974 3,794,299

INVENTORS
Joseph A. Dorn
Louis E. Wagner
Andrew T. McCord
BY Christel & Bean
ATTORNEYS.

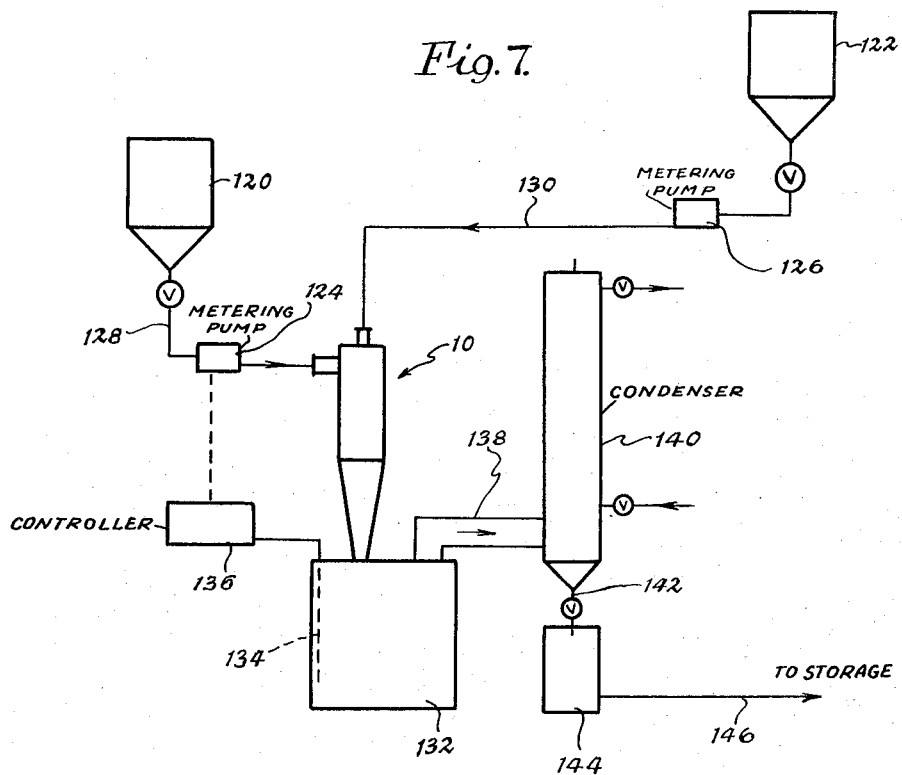

3,794,299

CENTRIFUGAL REACTOR

BACKGROUND OF THE INVENTION

This invention relates generally to apparatus for completely mixing or blending fluids in a continuous operation and, more particularly, to apparatus for neutralizing industrial waste products.

In the art of environmental control, various means have been devised to clean and decontaminate harmful industrial wastes. For example, waste products in the form of pickle liquors which are used in the treatment of metals during the production thereof and contain large percentages of acids, must be treated to neutralize these spent acids so that the resultant effluent may enter the environment in compliance with various pollution abatement codes. While neutralization ponds have been effective in neutralizing spent acids, they require vast areas of space and the neutralization process is time consuming. Accordingly, various types of apparatus and equipment have been designed to speed up the neutralization process, such apparatus normally handling batch-type operations and utilizing costly agitators, pumps and equipment having movable parts subject to wear and replacement. Moreover, this expensive equipment must be frequently cleaned and periodically replaced because of the highly corrosive conditions encountered. Not only is the cost of the equipment unduly high, but large power requirements are necessary adding to the costs, and production is limited to batch sizes.

SUMMARY OF THE INVENTION

Accordingly, it is an object of the present invention to provide an improved reactor of relatively small size, which is simple and strong in construction, sufficiently low in cost to render it economically expendable, rugged and durable in use, utilizes only a minimum of power, has no moving parts, and is continuously operative for effecting a complete reaction at a rapid rate.

In one aspect thereof, the reactor of the present invention is characterized by a small, compact enclosure having a lower conical portion terminating in a discharge outlet. A tangentially related inlet is provided adjacent the upper end of the enclosure for directing a stream of reactant tangentially into the enclosure along the inner surfaces thereof, the reactant forming a film moving spirally downwardly along such surfaces. A second reactant enters through the top end of the enclosure into a sparger having openings at the lower end thereof for directing the second reactant as a spray against the first reactant at generally right angles thereto for effecting a complete blending and reaction therewith at a rapid rate.

The foregoing and other objects, advantages and characterizing features of the present invention will become clearly apparent from the ensuing detailed description of certain illustrative embodiments thereof, taken together with the accompanying drawings wherein like reference characters denote like parts throughout the various views.

BRIEF DESCRIPTION OF THE DRAWING FIGURES

FIG. 1 is a side elevational view of a centrifugal reactor of the present invention;

FIG. 2 is a longitudinal sectional view, on an enlarged scale, of the centrifugal reactor of the present invention;

FIG. 3 is a transverse sectional view thereof taken about on line 3—3 of FIG. 2;

FIG. 7 is a diagrammatic view of still another system incorporating the centrifugal reactor of this invention.

DETAILED DESCRIPTION OF AN ILLUSTRATIVE EMBODIMENT

Figure 4:
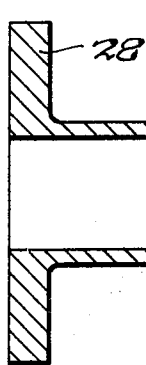
FIG. 4 is a transverse sectional view thereof taken about on line 4—4 of FIG. 2.

Referring now in detail to the illustrative embodiment depicted in the drawings, there is shown in FIGS. 1 and 2 a centrifugal reactor, constructed in accordance with this invention and generally designated 10, comprising an enclosure 12 having a top end wall 14, an upper cylindrical side wall portion 16 and a lower conical side wall portion 18 merging at its upper end with the lower end of cylindrical wall portion 16. Conical side wall portion 18 is in the form of a truncated cone tapering downwardly at a continuously reduced internal diameter to a point of minimum internal diameter defining a discharge outlet 20. The lower end of conical wall portion 18 is provided with an annular flange 22 adapted to be secured to a storage tank or to a piping arrangement, as desired, by suitable means (not shown) for collection or conveyance of the discharged product.

A conduit 24 is formed integral with or otherwise fixedly secured to enclosure 12 and is joined tangentially to the upper end of cylindrical wall portion 16 (FIG. 4) such as to direct a stream conveyed through conduit 24 tangentially along the inner surfaces of cylindrical wall portion 16. The inner end of conduit 24 defines an inlet 26 for enclosure 12. The other end of conduit 24 is provided with an annular flange 28 adapted to be connected to a supply line 29 by a suitable coupling (not shown).

An elongated tube 30 extends downwardly through top end wall 14 and is welded or otherwise fixedly secured thereto in a fluid tight relation. Tube 30 is concentric with cylindrical wall portion 16 and terminates at its inner end below inlet 26. The other or outer end of tube 30 is provided with an annular mounting flange 32 secured to a support flange 34 by any suitable means (not shown), such for example as bolts extending through aligned openings in flanges 32 and 34. A sparger 36, in the form of an elongated hollow tube or conduit is rigidly secured to flange 34 and is concentrically disposed within tube 30. Sparger 36 projects downwardly below the lower end of tube 30 and is provided with a plurality of openings 38 adjacent the lower end thereof for directing a fluid spray radially from sparger 36. The number of openings 38 and the pattern in which they are disposed can vary, as desired. A cap 40 is mounted on the inner distal end of sparger 36 for closing the latter. The upper end of sparger 36 is threaded, as shown at 42 in FIG. 2, for connection to a suitable coupling 44 connected to a supply line 46. A water supply line 48 can be tapped into coupling 44 for flushing the interior of enclosure 12, if desired.

While the foregoing apparatus can be employed in any process wherein two fluid components are to be blended in stoichemetric ratio and where complete blending and reaction are required, its operation will be described in detail with particular reference to the process of neutralizing a harmful waste product such as spent pickle liquor, for example, which is used in the treatment of steel and contains a mixture of $H_2SO_4$ and $FeSO_4$. With reference to the diagrammatic illustration of FIG. 5, there is shown a tank 50 for containing the pickle liquid and a tank 52 for storing a waste alkaline liquor containing about 20 percent calcium oxide. A conduit 54, having a conventional control valve 56 therein, connects tank 50 to a metering pump 58 having an outlet connected to line 46 which, in turn, is connected to sparger 36 by means of coupling 44. A conduit 60, having a conventional control valve 62 therein, connects tank 52 to a metering pump 64 having an outlet connected to line 29 leading to conduit 24. Metering pumps 58 and 64 are conventional and are adjustable to deliver liquids at a given rate under a predetermined pressure.

Figure 5:
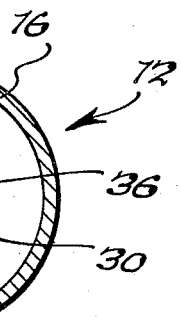
FIG. 5 is a diagrammatic view of a system incorporating the centrifugal reactor of this invention.

In operation, the lime slurry is conveyed as a high velocity stream through conduit 24 and inlet 26 tangentially into enclosure 12 along the inner surface of cylindrical wall portion 16. Tube 30 defines an annular chamber at the upper end of enclosure 12, and tends to guide the stream of slurry toward and along such inner surface. This stream of slurry forms a moving film on the inner surface of wall portion 16 and is directed in a spiral, cyclone-like path downwardly along such surface and the inner surface of conical wall portion 18 which facilitates the spiral movement of the slurry film. The pickle liquor flows into sparger 36 via tank 50, the opened valve 56, pump 58 and line 46 and is discharged into enclosure 12 through openings 38 as a spray substantially at right angles to the path of movement of the spiraling lime slurry producing a shear force to thoroughly mix the reactants together to form a neutral semi-solid mixture which is discharged through the apex outlet 20. The process is continuous with the reactants continually fed into enclosure 12 at predetermined rates. As shown in FIG. 5, the neutralized product can be discharged into a holding tank 66, or outlet 20 can be connected to a piping arrangement or conveyor system for conveying the finished product to a remote location for subsequent treatment, if desired. In either arrangement, a probe 68 is located in the path of the discharge flow and is operatively connected to a pH controller 70 for sensing the neutrality of the finished product Controller 70 also is connected to metering pump 64 for adjusting the output thereof depending on the acidity or alkalinity of the discharged product as sensed by probe 68. Thus, if the affluent is acidic beyond tolerable limits, controller 70 is effective to increase the output of pump 64. Alternatively, controller 70 can be connected to metering pump 58 to increase or decrease the output thereof, as required, in accordance with the acidic content of the discharged affluent.

A significant advantage residing in this invention is the compactness and relatively small size of the reactor relative to the volume of waste product capable of being processed therethrough. As an illustration, a typical reactor 10 having an overall enclosure length of approximately fifteen inches and a cylindrical wall portion diameter at its largest dimension of four inches with a one inch diameter inlet can process several thousand gallons of waste materials per hour. As an example, a lime slurry containing 20 percent calcium oxide can enter an enclosure 12 of the above dimensions at a rate of 60 gallons per minute producing a film of lime slurry one-eighth inch thick along the inner surface of wall portion 16. A pickle liquor containing the equivalent of 20 percent free sulphuric acid can be introduced into enclosure 12 at a rate of approximately 120 gallons per minute to react with the lime slurry to yield a completely neutral semi-solid mixture, e.g., calcium sulphate and ferrous or ferric hydroxide, continuously discharged through outlet 20. Such a mixture is harmless and can be used as legitimate land fill or can be further processed and converted into a commercial product, such as wallboard for example. The retention time of the waste products from inlet to outlet in an enclosure 12, having the above dimensions, is about one-fourth of a second. While the above example illustrates the small size of the unit relative to the volume of waste materials handles, it should be understood that these dimensions are exemplary only and can vary as dictated by the particular application.

It has been found that in the neutralization of spent acids with the centrifugal reactor of this invention, lime slurries up to 30 percent calcium oxide can be used and acid concentrations up to 98 percent are practical. For example, an effluent containing 50 percent solids is obtained with a 30 percent lime slurry and a 40 percent equivalent sulphuric acid liquid while a 20 percent lime slurry and a 98 percent sulphuric acid liquid also will yield a 50 percent solids final product. The usual pickle liquor, which contains 4–7 percent $H_2SO_4$ and 12–18 percent $FeSO_4$ will produce a neutral cake containing about 30–35 percent solids.

As previously mentioned, the centrifugal reactor of this invention is not limited in use for neutralizing waste products containing lime and sulphuric acid. For example, phosphoric acid solutions can be reacted with lime slurries to produce insoluble calcium phosphates, or the alkali can be sodium hydroxide and the product a solution of sodium phosphate. Any suitable alkali can be used provided it can be slurried or dissolved in water. Likewise any acidic liquid can be used. Also, plating liquids containing chromium salts can be rendered insoluble by first reducing the chromium from the six valent form to the tri-valent form and then neutralizing with lime slurry. Noxious liquids such as pyridine solutions, boron trifluoride complexes, phenolic solutions, and all of the odorous organic amines and amides can be neutralized with a minimum of fume and, in most instances, without any fume. Indeed, the centrifugal reactor of the present invention has utility in any process wherein two fluid components are to be blended in stoichemetric ratio and where complete blending and reaction is required. While preferably the centrifugal reactor of this invention is utilized in processing liquid reactants, it should be appreciated that gases also can be handled therein, as will presently appear.

Figure 6:
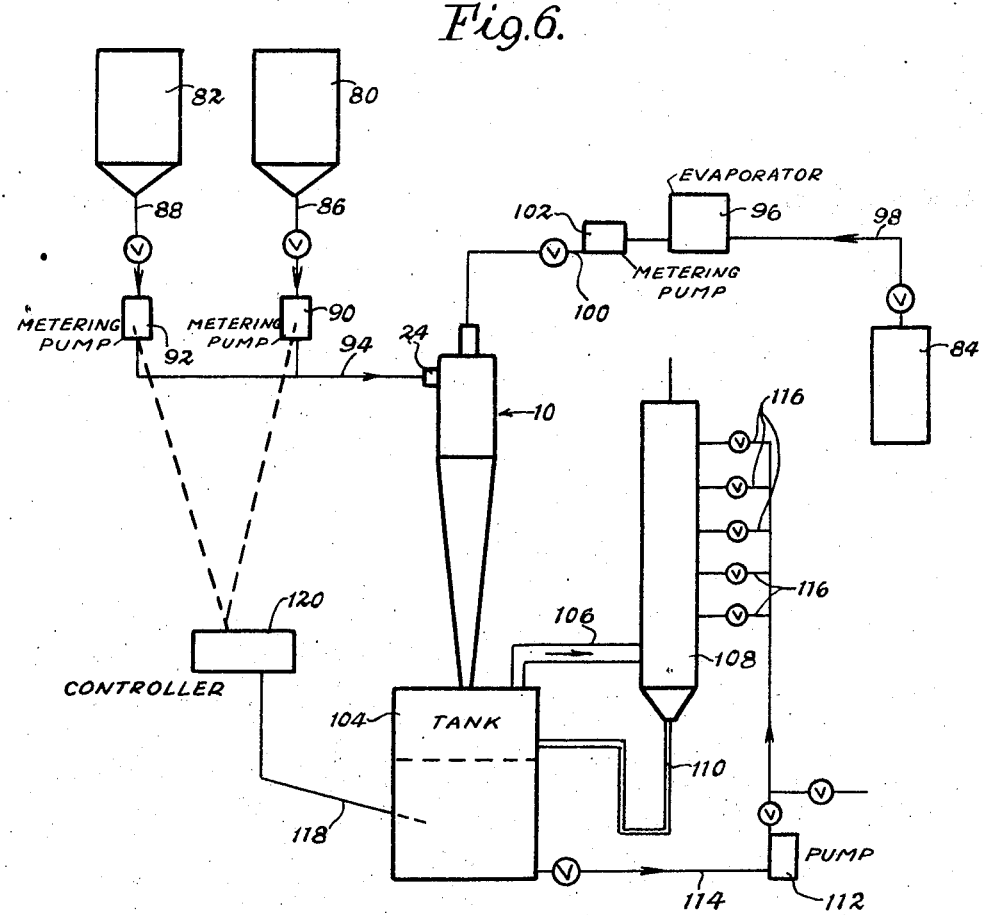
FIG. 6 is a diagrammatic view illustrating another system in which the centrifugal reactor of the present invention has utility.

FIG. 6 diagrammatically illustrates a system for the treatment of waste materials containing cyanide, such as the cyanide wastes accumulated in the process of plating various metals for example. Conventionally, the cyanide content has been destroyed in a batch type operation, a standard installation handling about 5,000 gallons of cyanide plating wastes and requiring eleven hours for complete destruction of the cyanide content. In this operation, sodium cyanide is made to react with sodium hydroxide and chlorine according to the equation $2NaCN + 8NaOH + 5Cl_2 \rightarrow 10NaCl + 4H_2O + N_2 + 2CO_2$. While the quantity of chlorine necessary to react according to the above equation is only 3.62 pounds per pound of sodium cyanide, it was found that ten pounds of chlorine were used for every pound of sodium cyanide. It is readily apparent that this conventional batch-type operation not only has limited capacity, but also is grossly inefficient. It has been found that the centrifugal reactor 10 of this invention can be efficiently employed in such an application to destroy the cyanide content at a relatively high operating rate in a system such as that illustrated in FIG. 6.

Referring now to FIG. 6, there is shown a tank 80 for containing the spent cyanide solution, a tank 82 for containing a waste alkaline liquor, and a tank 84 for storing liquid chlorine. Conduits 86 and 88, having metering pumps 90 and 92, respectively, connect tanks 80 and 82 to a common line 94 leading to conduit 24 of centrifugal reactor 10. Tank 84 is connected to an evaporator 96 by conduit 98. A conduit 100, having a metering pump 102 therein, connects evaporator 96 to the sparger 36 in reactor 10. Metering pumps 90, 92 and 102 are conventional and are adjustable to deliver fluids at a given rate under predetermined pressures.

The processed waste product is discharged into a holding tank 104, which also contains a predetermined amount of water. A conduit 106 connects the top of tank 104 to an absorption or spray tower 108 having a discharge outlet at the bottom thereof connected to a conduit 110 leading to the upper portion of tank 104. A circulating pump 112 receives liquid from holding tank 104 through supply line 114 and delivers the same under pressure to a series of vertically spaced lines 116 leading to discharge jets located in tower 108 for spraying the liquid downwardly in tower 108. A probe 118 is located in holding tank 104 and is operatively connected to a pH controller 120 for sensing the neutrality of the final product. Controller 120 also can be connected to metering pump 90 or metering pump 92 to adjust the respective outputs thereof depending on the acidity or alkalinity of the discharged product as sensed by probe 118.

In operation, the cyanide solution or wastes in tank 80 are analyzed for cyanide content. Knowing the sodium hydroxide content in the alkali solution of tank 82, the rates of alkali and chlorine consumption can be determined and pumps 90, 92 and 104 adjusted accordingly. The cyanide and alkali solutions are conveyed as a high velocity stream through conduit 24 and inlet 26 tangentially into reactor enclosure 12 along the inner surface of cylindrical wall portion 16. This stream forms a moving film on the inner surface of wall portion 16 and is directed in a spiral or helical path downwardly along such surface and the inner surface of conical wall portion 18. The chlorine issuing from tank 84 is formed into a gas in evaporator 96 and is introduced into sparger 36 via conduit 100. The chlorine gas is discharged through sparger openings 38 under pressure and expands to completely fill the space in enclosure 12 whereby the entire surface area of the thin swirling film of liquid is exposed to the chlorine gas atmosphere to effect a substantially complete reaction. The liquid waste product is discharged through reactor outlet 20 into tank 104. A very small percentage of free cyanide fails to react in reactor 10 and is discharged into tank 104. However, the liquid in tank 104 is conveyed to tower 108 via conduit 114, pump 112 and lines 116 and is discharged through the spray jets provided in tower 108. Simultaneously, some of the free chlorine gas which has not reacted and is expelled into the top of tank 104 flows through conduit 106 into the bottom of absorption tower 108. The remaining cyanide in tower 108 is caused to react with the excess chlorine gas to complete the reaction and the resultant harmless liquid is discharged outwardly from the bottom of tower 108 into conduit 110 and eventually into tank 104. The liquid in tank 104 is continuously circulated in this manner throughout the entire operation. When tank 104 is filled to a predetermined level, the operation through reactor 10 is terminated and the circulation of the liquid through tower 108 continues for a predetermined period of time until all the cyanide and substantially all the chlorine are destroyed.

In one example, the cyanide solution contained 0.1 pounds per gallon of sodium cyanide and 0.05 pounds per gallon of free sodium hydroxide. The alkaline solution in tank 82 contained about thirty percent sodium hydroxide. In this example, a larger sized reactor 10 was employed and had a cylindrical portion length of 3 feet and a 1 foot diameter and a conical portion length of 6 feet terminating in a 2 inch diameter outlet. Metering pump 90 was set to deliver 60 gallons per minute and metering pump 92 was adjusted accordingly to deliver 5.8 gallons per minute. The chorine flow metering pump 102 was fixed at 110 c.f.m., which corresponds to about 21.5 pounds per minute. Controller 120 was set at 9pH. Circulating pump 112 had a fixed delivery of 40 gallons per minute and holding tank 104 contained sufficient water enabling pump 112 to maintain the spray jets in tower 108 in steady operation. The moving liquid film along the inner surface of reactor 10 was about 0.085 inches thick and the retention time thereof was about 0.56 seconds.

Under the above conditions, approximately 99 percent of the cyanide content was destroyed in reactor 10 with the remainder being completely destroyed in absorption tower 108. The total time for a 5,000 gallon run was less than 1.5 hours and the finished processed product revealed only 5 ppm chlorine, which may safely enter the environment in compliance with all known pollution abatement codes. Thus, it is seen that the centrifugal reactor of this invention can be readily employed in the treatment of cyanide wastes and is far more efficient and operable at higher rates than those operations commonly used today.

Still another practical application of the centrifugal reactor 10 of this invention is illustrated diagrammatically in FIG. 7 of the drawings. In the production of carbon tetrachloride by the chlorination of carbon disulphide in the solution of sulphur chloride, there is an increase in the quantity of sulphur chloride in the system and the accumulation of chloroform from a side reaction. In the course of time, this excessive and accumulated waste material in the system must be removed and/or destroyed. FIG. 7 illustrates a system, incorporating the centrifugal reactor of the present invention, for destroying such waste materials. As shown in FIG. 7, a tank 120 is provided for containing a suitable alkaline solution and a tank 122 stores the waste liquor.

Suitable metering pumps 124 and 126 are located in lines 128 and 130 leading to conduit 24 and sparger 36, respectively, of centrifugal reactor 10. The outlet of reactor 10 discharges into a holding tank 132 including a probe 134 operatively connected to controller 136, in turn connected to pump 124 to adjust the same in accordance with the acidity and/or alkalinity of the waste product received in tank 132 as hereinbefore described. A conduit 138 connects the upper end of tank 132 to a condenser 140 for delivering gases generated in reactor 10 to condenser 140. An outlet 142 is provided at the bottom of condenser 140 for discharging the liquid product therefrom to a tank 144 having a discharge conduit 146 leading to storage.

In an exemplary operation, a typical waste liquor containing approximately 80 percent sulphur chloride ($S_2Cl_2$), 18 percent chloroform ($CHCl_3$) and 2 percent carbon disulphide ($CS_2$) was destroyed in the centrifugal reactor of this invention using a lime slurry containing about 10 percent calcium oxide ($CaO$). The chloroform and carbon disulphur were converted into gases in reactor 10 and subsequently condensed to a liquid in condenser 140. Only the sulphur chloride reacts with the lime according to the equation: $S_2Cl_2 + Ca(OH)_2 \rightarrow CaCl_2 + 2S + H_2O +$ heat. From this equation, 135 pounds of sulphur chloride react with 56 pounds of calcium oxide or 74 pounds of calcium hydroxide. The waste liquor had a density of 13.3 pounds per gallon and each gallon of such waste liquor required 5 gallons of the 10 percent CaO lime slurry for a proper reaction. Accordingly, prior to operation, pump 124 was set to deliver 100 gallons per minute of the lime slurry to reactor 10 and pump 126 was adjusted to deliver 20 gallons from tank 122 to reactor 10. Controller 136 was set at 7.5 pH.

In operation, pumps 124 and 126 were activated and water circulated through condenser 140 to begin the operation. Because of the intense heat generated in reactor 10, on the order of 110°C for example, gaseous chloroform, carbon disulphide and steam were formed. These gases flowed through conduit 138 into condenser 140 and were condensed into a liquid state, which was discharged through outlet 142 into tank 144. After the operation was completed, tank 132 contained a slurry of calcium chloride solution, sulphur, and a small amount of calcium hydroxide without any noxious odor of carbon disulphide. Thus, it is seen that the reactor of this invention can be efficiently used at a high operating rate in the treatment of noxious, poisonous waste materials containing sulphur chloride, chloroform and carbon disulphide and has utility in applications where gases are generated. The systems described above and shown in FIGS. 6 and 7 are illustrated only, it being understood that the centrifugal reactor of this invention has utility in a wide variety of applications and can be integrated into other chemical processes.

From the foregoing, it is apparent that the objects of the present invention have been fully accomplished. As a result of this invention, an improved reactor is provided for continuously blending two reactants at a rapid rate to effect a complete and accurate neutralization or reaction in a continuous process. The reactor is small and compact for ease of handling and can be readily attached to existing waste product piping systems. If desired, the reactor can be rendered mobile to discharge the effluent thereof in any desired land cavity. Because of the low cost of the reactor, it is expendable without materially increasing operating costs. However, a plastic liner can be adhesively secured to the inner wall surfaces of the reactor to prolong the useful life thereof, if desired. Also, there are no movable parts within the reactor proper, further realizing a savings in operating costs. The only power requirements necessary are those for the metering pumps, which are located exteriorly of the reactor enclosure. Also, the reactor is substantially self-cleaning due to the continuous spiraling flow of the reactant liquids therethrough. If necessary, the reactor can be completely flushed without any removal or disassembly of parts.

Another advantage residing in the reactor of the present invention is that any heat generated by the reaction does not interfere with the reaction or limit production as opposed to batch-type operations wherein the heat generated may be sufficiently large to render the operation time consuming or adequate cooling must be provided if a rapid reaction is to be realized.

Preferred embodiments of this invention having been disclosed in detail, it is to be understood that this has been done by way of illustration only.

We claim:

1. A reactor comprising: an enclosure having an upper portion and a lower portion terminating in a reduced diameter portion defining an outlet, said upper and lower portions having inner wall surfaces, means for admitting a stream of reactant under pressure tangentially into said upper portion causing said reactant to form a film moving in a spiral path downwardly along said inner wall surfaces, means for introducing a second reactant radially under pressure into said enclosure as a spray against said moving film of first reactant at substantially right angles thereto.

2. A reactor according to claim 1 wherein said first mentioned means comprises a first conduit connected tangentially to said upper portion, and said last mentioned means comprises a second conduit within said enclosure in radially spaced relation to said inner wall surfaces and having a plurality of circumferentially spaced openings disposed below said first conduit.

3. A reactor according to claim 2 including a closure member on the inner end of said second conduit below said circumferentially spaced openings.

4. A reactor according to claim 1 wherein said upper portion is cylindrical in shape and said lower portion extends downwardly from said cylindrical upper portion and has a truncated conical configuration tapering downwardly to said outlet.

5. A reactor as defined in claim 1 wherein said first reactant is a liquid waste product and said second reactant is a gas.

6. A reactor according to claim 1 wherein said last mentioned means includes a conduit within said enclosure having a closed end and a plurality of circumferentially spaced openings for discharging said second reactant.

7. A reactor comprising: an enclosure having an upper portion and a lower portion terminating in a reduced diameter portion defining an outlet, said upper and lower portions having inner wall surfaces, means for admitting a stream of reactant under pressure tangentially into said upper portion causing said reactant to form a film moving in a spiral path downwardly along said inner wall surfaces, means for introducing a second reactant radially under pressure into said enclosure as a spray against said moving film of first reactant at substantially right angles thereto, said first mentioned means comprising a first conduit connected tangentially to said upper portion, said last mentioned means comprising a second conduit within said enclosure in radially spaced relation to said inner wall surfaces and having a plurality of circumferentially spaced openings disposed below said first conduit, said enclosure upper portion having an end wall, a hollow tube extending through said end wall into said enclosure between said inner wall surfaces and said second conduit in radially spaced relation thereto.

8. A reactor according to claim 1 wherein said tube has one end projecting axially outwardly from said end wall and provided with connecting means attachable to a supporting structure.

9. A reactor according to claim 8 wherein said other end of said tube terminates in an end portion disposed below said first conduit and above said circumferentially spaced openings of said second conduit.

10. A reactor according to claim 8 wherein said second conduit is rigidly secured at the outer end thereof to an annular flange forming a closure for said tube and attachable to said tube connecting means.

* * * * *

UNITED STATES PATENT OFFICE
CERTIFICATE OF CORRECTION

Patent No. 3,794,299　　　　　Dated February 26, 1974

Inventor(s) Louis E. Wagner et al.

It is certified that error appears in the above-identified patent and that said Letters Patent are hereby corrected as shown below:

Column 9, line 13, "1" should read -- 7 --.

Signed and sealed this 1st day of October 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,794,299                    Dated February 26, 1974

Inventor(s) Louis E. Wagner et al.

It is certified that error appears in the above-identified patent and that said Letters Patent are hereby corrected as shown below:

Column 7, line 21, "carbon disulphur" should read -- carbon disulphide --.

Signed and sealed this 12th day of November 1974.

(SEAL)
Attest:

McCOY M. GIBSON JR.                    C. MARSHALL DANN
Attesting Officer                      Commissioner of Patents